(12) United States Patent
Ben-Yehuda et al.

(10) Patent No.: US 7,900,003 B2
(45) Date of Patent: Mar. 1, 2011

(54) SYSTEM, METHOD AND COMPUTER PROGRAM PRODUCT FOR STORING AN INFORMATION BLOCK

(75) Inventors: Shmuel Ben-Yehuda, Haifa (IL); Michael Factor, Haifa (IL); Guy Laden, Jaffa (IL); Paula Ta-Shma, Tel Aviv-Jaffa (IL); Aviad Zlotnick, Mitzpeh Netofa (IL)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 11/738,153

(22) Filed: Apr. 20, 2007

(65) Prior Publication Data

US 2008/0263296 A1  Oct. 23, 2008

(51) Int. Cl.
*G06F 12/02* (2006.01)

(52) U.S. Cl. .................. 711/162; 711/161; 711/152; 711/163; 707/654

(58) Field of Classification Search ......... 711/161–163, 711/152; 707/644–645, 654
See application file for complete search history.

(56) References Cited

U.S. PATENT DOCUMENTS 6,629,227 B1 * 9/2003 Jerding et al. ............... 711/170

* cited by examiner

*Primary Examiner*—Jasmine Song
(74) *Attorney, Agent, or Firm*—Jeffrey P. Aillo

(57) ABSTRACT

A method for storing an information block that includes determining to store a current version of an information block stored in a memory unit. The checking if a current version of the information is already stored in a storage unit. The current version of the information block is sent from the memory unit to the storage unit if the answer is negative. Generating storage unit location information indicative of a location, at the storage unit, of the current version of the information block if the answer is positive.

20 Claims, 2 Drawing Sheets

SYSTEM, METHOD AND COMPUTER PROGRAM PRODUCT FOR STORING AN INFORMATION BLOCK

FIELD OF THE INVENTION

The present invention relates to methods, systems and computer program products for storing an information block.

BACKGROUND OF THE INVENTION

Check-pointing is a common building block in approaches to fault tolerance of software. The transient state of a system usually includes multiple information blocks that are stored in multiple memory pages of a memory unit. A system employing check-pointing periodically saves its transient state to a storage unit (such as disk, disk array, tape or other non-volatile storage unit) from which the state can be recovered into the memory unit. Saving the entire transient state at the storage unit is expensive and also storage consuming. Incremental check-pointing reduces the cost and overhead associated with check-pointing by storing only memory pages that were altered after the previous check-pointing operation occurred.

Check-pointing in general and incremental check-pointing in particular have been successfully applied in high performance computing systems, where multiple processor nodes execute long and complex computations.

There is a growing need to provide devices, computer program products and methods for efficient storage of information blocks.

SUMMARY OF THE PRESENT INVENTION

A method for storing an information block, the method includes: determining, during a check-pointing operation, to store a current version of an information block stored in a memory unit; checking if a current version of the information block is already stored in a storage unit; sending the current version of the information block from the memory unit to the storage unit if the current version of the information block is not already stored in the storage unit; and generating storage unit location information indicative of a location, at the storage unit, of the current version of the information block if the current version of the information block is already stored in a storage unit and if the current version of the information block was sent to the storage unit by a non-check-pointing operation.

The current version of the information block is representative of a portion of a current transient state of a system. The checking includes evaluating whether the current version of the information block, at the memory unit, equals a version of the information block during a penultimate iteration of the checking. The checking includes analyzing a monitor data structure representative of exchange of information blocks between the storage unit and the memory unit by non-check-pointing operations. The method includes preventing overwriting, at the storage unit, of stored versions of information blocks. The preventing includes applying a content protection technique selected from the group of protection continuous data protection technique, snap-shotting technique, and content-aware-storage technique. The checking includes comparing a value representative of a content of a current version of the information block stored in the memory unit, to a value representative of a content of a last version of the information unit that is stored in the storage unit.

The method includes receiving a request to restore a previous state of a virtual machine and restoring the previous state of the virtual machine by selectively utilizing storage unit location information.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The method, computer program product and system illustrated below can store information blocks in various situations. For simplicity of explanation it is assumed that information blocks include portions of the transient state of a system and that these information blocks can be selectively sent to a storage unit during a check-pointing operation. Those of skill in the art will appreciate that the following description is not limited to check-pointing.

The system is characterized by frequent I/O operations, and the method and computer program product are applied at an environment in which frequent I/O operations occur. This is especially relevant in systems and environments where the I/O operations can not be isolated from other operations of the environment, and where there is a need to reduce the I/O operations associated with check-pointing.

The method, system and computer program product reduce the overhead associated with check-pointing by reducing the amount of information blocks that are sent to the storage unit. The overhead can be further reduced by using CDP storage unit or by applying content addressable storage or using snap-shots.

The method, system and computer program product do not require to interface with applications or to alter applications. It performs monitoring at the system level. For example it can be implemented in a library, the operating system, a virtual machine hypervisor, among other options. The method, system and computer program product can operate with any I/O operation pattern.

Figure 1:
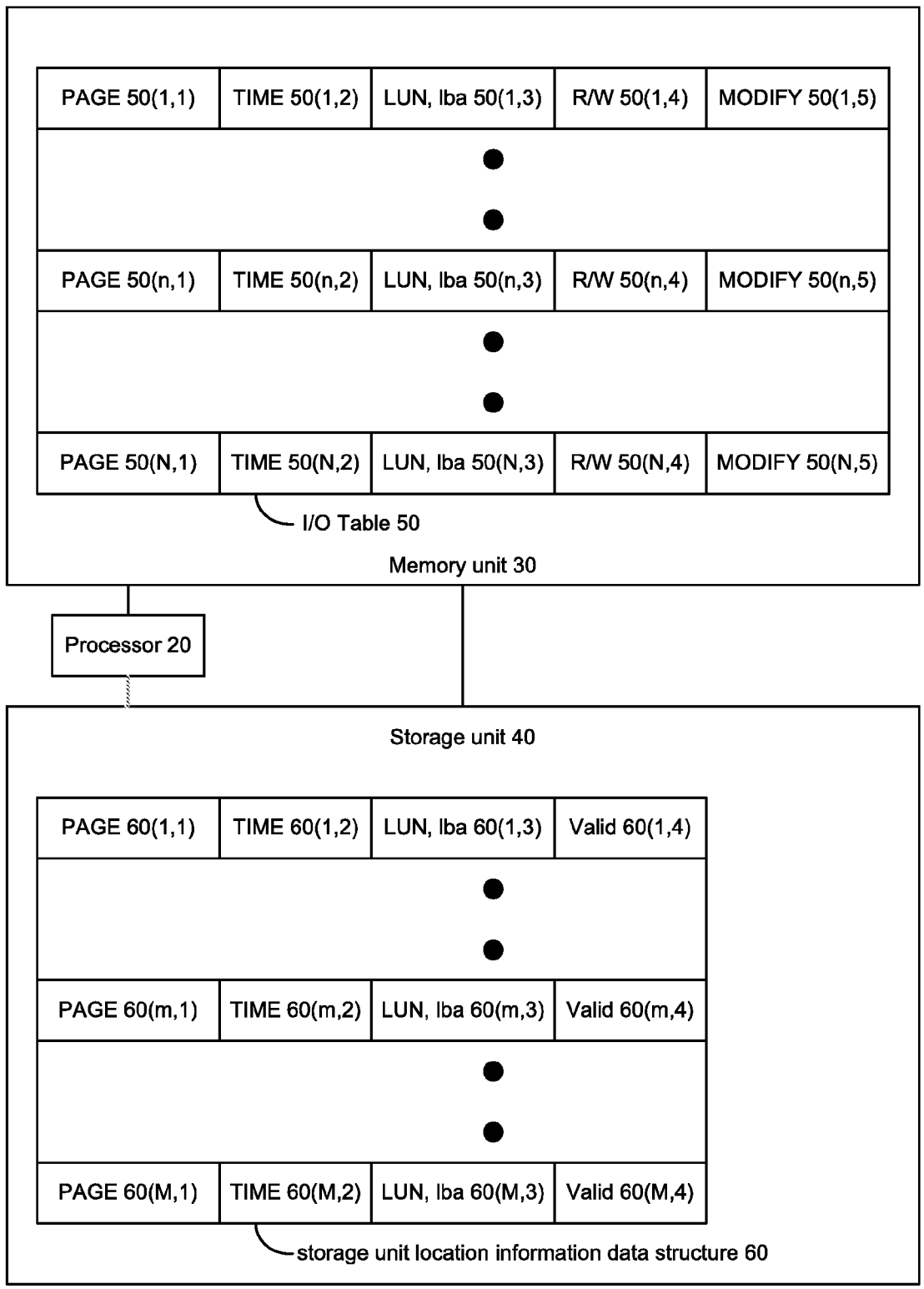
FIG. 1 illustrates a system for storing an information block according to an embodiment of the invention.

FIG. 1 illustrates system 10 for storing an information block according to an embodiment of the invention.

System 10 includes memory unit 30, storage unit 40 and processor 20. Processor 20 can include one or mode nodes and can maintain multiple virtual machines.

Processor 20 can access memory unit 30 and storage unit 40 and may request that information blocks will be transferred between memory unit 30 and storage unit 40. These transfer operations (not being a part of check-pointing operations) are also referred to as non-check-pointing operations or as I/O operations.

Storage unit 40 can be a continuous data protection (CDP) storage unit, thus multiple versions of data stored in storage unit 40 can be maintained. It is noted that this is not necessarily so and storage unit 40 can allow to overwrite content. In the latter case system 10 has to be aware to deletion of older content, so that system 10 does not base a retrieval effort on deleted content. The following explanation will refer to a system that protects the content of storage unit 40 by applying CDP.

Processor 20 can execute a check-pointing application or an incremental check-pointing application that periodically attempts to save the transient state of system 10. It is noted that processor 20 can periodically control the storage of other information and that the described below system and methods are not limited to check-pointing.

Processor 20 is adapted to repetitively: (i) determine to store a current version of an information block that can represent a portion of a current transient state of system 10; wherein the information block is stored in memory unit 30; (ii) check if a current version of the information block is already stored in storage unit 40; (iii) send the current version of the information block from memory unit 30 to storage unit 40 if the answer is negative; and (iv) generate storage unit location information indicative of a location, at storage unit 30, of the current version of the information block if the current version of information was sent to storage unit 40 during a non-check-pointing operation.

It is noted that check-pointing operations can result in the generation of check-pointing related location information representative of the locations, at the storage unit, of information blocks that were sent to the storage unit during check-pointing operations.

Processor 20 is adapted to periodically perform check-pointing operations. It is assumed that these check-pointing operations occur at intervals of T, where T is an arbitrary period that is usually determined in view of the storage, I/O and computational limitations of system 10 and especially in view of the resources that can be allocated for check-pointing.

If, for example, (i) a previous check-pointing operation occurred at time T1, (ii) an information block was written to storage unit at time (T1+ΔT) and was not modified afterwards, where ΔT<T, and (iii) a current check-pointing operation occurs at time (T1+T), then during this current check-pointing operations there is no need to copy that information page to the storage unit, just indicate where the previously copied version is located in the storage unit. In a similar way, if there was a read operation of a certain information page at time (T1+ΔT) and that page was not changed (in memory) till the next check-pointing operation then that information page need not be copied to the storage unit.

Processor 20 is also adapted to receive a request to retrieve the transient state of system 10 at a certain point in time and in response send to memory unit 30 information blocks. These information blocks were previously sent to storage unit 40 during check-pointing operations or during I/O operations. The retrieval of information blocks that were sent to storage unit 40 during I/O operations requires a retrieval of the storage unit location information (such as storage unit location information data structure 60) previously generated by system 10.

In order to support incremental check-pointing processor 20 can evaluate whether the information block (stored in memory unit 30) was not altered between consecutive check-pointing operations—it will check if the current version and the version of the information block during a penultimate iteration of the check-pointing operation are equal. Thus, if an information block was not changed between time T1 and time (T1+T) then this information block should not be sent to storage unit 40.

Processor 20 can apply various techniques for checking information block changes. These techniques can include page faulting, secure hashing, dirty bit indicative of changes in memory portions, and the like. Secure hashing may involve generating hash value representative of an information block at a check-pointing iteration and during the next check-pointing iteration generating another hash value and comparing the two hash values. It is noted that the hashing may be applied on every I/O operation.

In order to determine whether an information block is already stored in storage unit 40, processor 20 reads and analyses a monitor data structure (such as I/O table 50) representative of exchange of information blocks between storage unit 40 and memory unit 30 by I/O operations. I/O table 50 is stored in memory unit 30 and keeps track of I/O operations between storage unit 40 and memory unit 30.

I/O table 50 includes rows 50(1)-50(N), each representing a memory page that could have been transferred between storage unit 40 and memory unit 30. It is noted that a more concise table can be utilized if it includes a row per memory page that was actually transferred between storage unit 40 and memory unit 30. It is noted that even if only a portion of a memory page was transferred it should appear in I/O table 50.

Each row can indicate I/O operations that occurred after the last check-pointing operation.

It is noted that I/O table 50 can store information for long time periods, and usually a tradeoff is provided between an allowed size of I/O table 50 and the time period it can cover. This tradeoff can be influenced from the presence of a CDP mechanism, but this is not necessarily so.

Each row includes multiple fields—memory page address transferred during I/O operation ("PAGE") 50(n,1), time of I/O operation ("TIME") 50(n,2), storage unit location information (such as logical unit and logical branch address) ("LUN, lba") 50(n,3), I/O operation type (read or write) ("R/W") 50(n,4), and modify ("MODIFY") field 50(n,5) indicating if the memory page was modified after the last I/O operation occurred. It is noted that that field 50(n,1) can indicate the physical page number in memory unit 30.

I/O table 50 is used when a check-pointing operation is executed and there is a need to determine which information blocks should be sent to storage unit 40.

I/O table 50 is cleared at the beginning of each periodic check-pointing operation.

I/O table 50 keeps track of the latest I/O operations. If the same memory page was I/O transferred several times after the previous check-pointing operation only the last I/O operation will be represented in I/O table 50.

Storage unit 40 stores a storage unit location information data structure 60. Storage unit location information data structure 60 indicates the locations of information blocks (corresponding to memory pages) that were not sent to storage unit 40 during check-pointing operations but rather were sent during I/O operations.

Storage unit location information data structure 60 includes rows 60(1)-60(M), each representing a memory page that should have been sent to storage unit 40 during a check-pointing operation but was not transferred because it was previously sent to storage unit during an I/O operation.

Each rows include multiple fields—memory page that was not transferred during last check-pointing operation ("PAGE") 60(m,1), time of I/O operation ("TIME") 60(m,2), storage unit location information (such as logical unit and logical block address) ("LUN, lba") 60(m,3), and valid indication ("VALID") 60(m,4) indicating whether that memory page was transferred to storage unit 40 during a later check-pointing operation.

Storage unit location information data structure 60 can be also CDP protected, especially if travel in time is required.

It is noted that a memory page should not be written to storage unit 40 if its current version was read from storage unit 40 and not modified (at memory unit 30) after this retrieval.

Those of skill in the art will appreciate that embodiments of the invention can be applied on various processing systems (including distributed processing systems) and various storage systems without departing from the spirit of the invention. The processing system can be a host computer or server, but this is not necessarily so. The processing system and the storage system can be integrated with each other, remotely positioned from each other, connected directly or indirectly to each other and the like.

Figure 2:
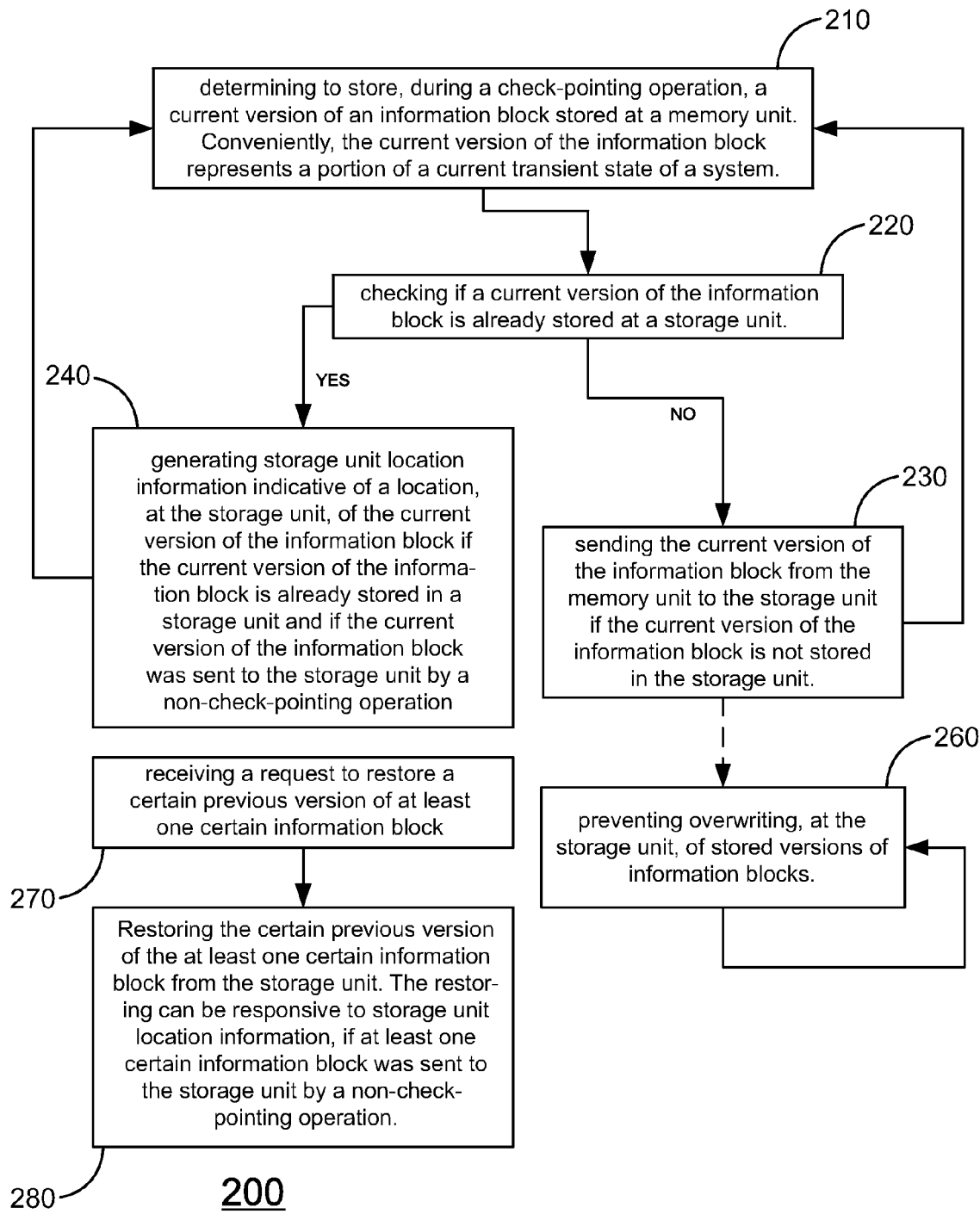
FIG. 2 illustrates a method for storing an information block according to another further embodiment of the invention.

FIG. 2 illustrates method 200 for storing an information block, according to an embodiment of the invention. Method 200 starts by stage 210 of determining to store a current version of an information block stored in a memory unit. The current version of the information block represents a portion of a current transient state of a system. The system includes a processor and can support one or more virtual machines, but this is not necessarily so. Accordingly, stage 210 can include determining to store a current version of one or more information blocks stored in the memory unit that reflect the current transient state of a virtual machine.

The timing of the determination can comply with a check-pointing scheme during which periodical check-pointing operations occur.

During a single check-pointing operation multiple information blocks should be evaluated in order to determine whether to be copied to a storage unit, or not. Accordingly, stage 210 can include determining whether to copy (or at least evaluate) multiple information blocks.

Stage 210 is followed by stage 220 of checking if a current version of the information block is already stored in a storage unit.

According to an embodiment of the invention method 200 includes incremental check-pointing. Accordingly, stage 220 includes evaluating whether the current version of the information block, at the memory unit, equals a version of the information block during a penultimate iteration of the checking.

If the content of the information block in the memory unit remained unchanged between the current check-pointing operation and the previous check-pointing operation, it will not be sent to the storage unit.

If the current version of the information block is not stored in the storage unit then stage 220 is followed by stage 230. Stage 230 includes sending the current version of the information block from the memory unit to the storage unit.

If the current version of the information block is already stored in the storage unit then stage 220 is followed by stage 240. Stage 240 includes generating storage unit location information indicative of a location, at the storage unit, of the current version of the information block that was sent to the storage unit during an non-check-pointing operation. Stage 240 includes preventing the current version of the information block from being sent to the storage unit from the memory unit.

Stage 220 includes analyzing a monitor data structure representative of exchange of information blocks between the storage unit and the memory unit by non-check-pointing operations.

Method 200 includes stage 260 of preventing overwriting, at the storage unit, of stored versions of information blocks. It is noted that full overwrite-prevention is not necessary and that the method can include sending relevant memory entries into an overwrite protected redirection table. It is noted that when stage 230 is applied and a current version of the information block is sent to the storage unit, stage 260 is applied to prevent overwriting of previously stored information. This relationship is illustrated by dashed arrow linking between boxes 230 and 260.

Stage 260 includes applying a continuous data protection technique. Alternatively content aware storage techniques, snap-shotting techniques or other mechanisms can be used.

Stage 220 of checking includes comparing a value representative of a content of a current version of the information block stored in the memory unit, to a value representative of a content of a last version of the information unit that is stored in the storage unit.

According to an embodiment of the invention method 200 also includes stage 270 of receiving a request to restore a certain previous version of at one or more certain information blocks. Conveniently, stage 270 includes receiving a request to restore a certain previous version of one or more information blocks that represent a certain previous transient state of a system. It is noted that stage 270 can include receiving a request to restore a certain previous state of a virtual machine.

Stage 270 is followed by stage 280 of restoring the certain previous version of the one or more certain information blocks from the storage unit, wherein the restoring can be responsive to storage unit location information, if at least one certain information block was sent to the storage unit by a non-check-pointing operation.

The certain previous state can be stored in information blocks that were sent to the storage unit during check-pointing operations and/or in information blocks that were sent to the storage unit during input/output operations and therefore not stored during check-pointing operations. In the latter case these information blocks are represented by storage unit location information that indicates where these information blocks are stored.

It is further noted that the storage of information blocks can involve receiving a request, from a customer, and over a network, to perform an information block storage operation (such as a check-pointing operation, performing various stages of method 200, and sending to the customer, over a network, an indication that the storage operation (such as the check-pointing operation) was completed.

A method for providing a service to a customer over a network is provided. The method includes: receiving a request, over a network, to initiate a check-pointing operation; determining, during the check-pointing operation, to store a current version of an information block stored in a memory unit; checking if a current version of the information block is already stored in a storage unit; sending the current version of the information block from the memory unit to the storage unit if the current version of the information block is not already stored in the storage unit; generating storage unit location information indicative of a location, at the storage unit, of the current version of the information block if the current version of the information block is already stored in a storage unit and if the current version of the information block was sent to the storage unit by a non-check-pointing operation; and sending to the customer an indication; over the network, that the check-pointing operation is completed. This method may include executing various stages of method 200, such as stages 210-240.

A method for providing a service to a customer over a network is provided. The method includes: receiving a request, over a network, to receive a certain version of a transient state of a software entity (such as a hypervisor, one or more virtual machines, and the like); retrieving multiple information blocks representative of the certain version of the transient state of the software entity in response to check-pointing related location information and in response to storage unit location information indicative of a location, at the storage unit, of at least one information block that includes at least a portion of the certain version of the transient state of the software entity if the current version of the at least one information block was sent to the storage unit by a non-check-pointing operation; and sending to the customer the certain version of the transient state of the software entity. This method may include executing various stages of method 200, such as stages 260-270.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." . Furthermore, aspects of the invention may take the form of a computer program product embodied in one or more computer readable medium(s) having computer readable program code embodied thereon.

Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a semiconductor or solid-state memory, magnetic tape, a removable computer diskette, a random access memory (RAM), a read-only memory (ROM), a rigid magnetic disk, an erasable programmable read-only memory (EPROM or Flash memory), an optical fiber, a portable compact disc read-only memory (CD-ROM), and an optical disk, or any suitable combination of the foregoing. Current examples of optical disks include compact disk-read only memory (CD-ROB), compact disk-read/write (CD-R/W) and DVD. In the context of this document, a computer readable storage medium may be any tangible medium that can contain, or store a program for use by or in connection with an instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Those of skill in the art will appreciate that the mentioned above method, systems and computer program products can be applied even when check-pointing is not applied. For example the method can be used for selectively preventing write operations to a storage unit of information entities that are already present at the storage unit. The method can also prevent read operations of information entities that are already stored in the memory.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:
1. A method comprising:
   determining to store a current version of an information block stored in a memory unit during a check-pointing operation;
   evaluating if a current version of the information block is stored in a storage unit;
   sending the current version of the information block to the storage unit if the current version of the information block is not stored in the storage unit;
   generating storage unit location information indicative of a location, of the current version of the information block if the current version of the information block is stored in a storage unit and if the current version of the information block was sent to the storage unit by a non-check-pointing operation; and
   preventing overwriting of stored versions of information blocks stored in the storage unit by applying a content protection technique, the content protection technique selected from the group consisting of at least continuous data protection.

2. The method of claim 1 wherein the current version of the information block is representative of a portion of a current transient state of a system.

3. The method according to of claim 1 wherein evaluating if a current version of the information block is stored in a storage unit further comprises:
   evaluating if the current version of the information block in the memory unit, equals a version of the information block while determining if the current version of the information block is stored in a storage unit.

4. The method of claim 1 wherein evaluating if a current version of the information block is stored in the storage unit comprises analyzing a monitor data structure representative of exchange of information blocks between the storage unit and the memory unit by non-check-pointing operations.

5. The method of claim 1 wherein preventing overwriting of stored versions of information blocks stored in the storage unit by applying a content protection technique comprises applying a content protection technique selected from the group of protection continuous data protection, snap-shotting, and content-aware-storage.

6. The method according to of claim 1 wherein evaluating if a current version of the information block is stored in a storage unit further comprises:
   comparing a value representative of a content of a current version of the information block stored in the memory unit to a value representative of a content of a last version of the information unit that is stored in the storage unit.

7. The method according to of claim 1 further comprising receiving a request to restore a previous state of a virtual machine and restoring the previous state of the virtual machine by selectively utilizing storage unit location information.

8. A computer program product comprising:
a computer usable medium having a computer readable program code embodied therewith, the computer readable program comprising:
computer readable program code configured to determine to store a current version of an information block representative of a portion of a current transient state of a system during a check-pointing operation, the information block stored in a memory unit;
computer readable program code configured to evaluate if a current version of the information block is stored in a storage unit;
computer readable program code configured to send the current version of the information block to the storage unit if the current version of the information block is not stored in the storage unit;
computer readable program code configured to generate storage unit location information indicative of a location of the current version of the information block if the current version of the information block is stored in the storage unit and if the current version of the information block was sent to the storage unit by a non-check-pointing operation; and
computer readable program code configured to prevent overwriting of stored versions of information blocks stored in the storage unit by applying a content protection technique, the content protection technique selected from the group consisting of at least continuous data protection.

9. The computer program product of claim 8 further comprising:
computer readable program code configured to evaluate if the current version of the information block in the memory unit, equals a version of the information block while determining if the current version of the information block is stored in a storage unit.

10. The computer program product of claim 8 further comprising:
computer readable program code configured to analyze a monitor data structure representative of exchange of information blocks between the storage unit and the memory unit by non-check-pointing operations.

11. The computer program product of claim 8 further comprising:
wherein the group of content protection techniques further comprises at least snap-shotting and content-aware-storage.

12. The computer program product of claim 8 further comprising:
computer readable program code configured to compare a value representative of a content of a current version of the information block stored in the memory unit, to a value representative of a content of a last version of the information unit that is stored in the storage unit.

13. The computer program product of claim 8 further comprising:
computer readable program code configured to receive a request to restore a previous state of a virtual machine and restore the previous state of the virtual machine by utilizing storage unit location information.

14. A system comprising:
a storage unit, a memory unit and a processor, the processor operative to execute computer usable program code;
a computer usable medium having computer usable program code embodied therewith, the computer usable program code comprising:
computer usable program code configured to determine to store, a current version of an information block representative of a portion of a current transient state of the system during a check-pointing operation, the information block stored in a memory unit;
computer readable program code configured to evaluate if a current version of the information block is stored in a storage unit;
computer readable program code configured to send the current version of the information block to the storage unit if the current version of the information block is not stored in the storage unit;
computer readable program code configured to generate storage unit location information indicative of a location of the current version of the information block if the current version of the information block is stored in the storage unit and if the current version of the information block was sent to the storage unit by a non-check-pointing operation; and
computer readable program code configured to prevent overwriting of stored versions of information blocks stored in the storage unit by applying a continuous content protection technique, the content protection technique selected from the group consisting of at least continuous data protection.

15. The system of claim 14 further comprising:
computer readable program code configured to evaluate if the current version of the information block stored in at the memory unit equals a version of the information block while determining if the current version of the information block is stored in a storage unit.

16. The system according to of claim 14 further comprising:
computer readable program code configured to analyze a monitor data structure representative of exchange of information blocks between the storage unit and the memory unit by non-check-pointing operations.

17. A method comprising:
receiving a request to initiate a check-pointing operation over a network;
determining to store a current version of an information block stored in a memory unit during the check-pointing operation;
evaluating if a current version of the information block is stored in a storage unit;
sending the current version of the information block from the memory unit to the storage unit if the current version of the information block is not stored in the storage unit;
generating storage unit location information at the storage unit indicative of a location of the current version of the information block if the current version of the information block is stored in a storage unit and if the current version of the information block was sent to the storage unit by a non-check-pointing operation;
preventing overwriting of stored versions of information blocks stored in the storage unit by applying a continuous content protection technique, the content protection technique selected from the group consisting of at least continuous data protection; and
sending an indication that the checkpointing operation is completed to a customer over the network.

18. The method of claim 17 wherein the current version of the information block is representative of a portion of a current transient state of a system.

19. The method to of claim 18 wherein evaluating if a current version of the information block is stored in a storage unit further comprises:
  evaluating if the current version of the information blocker in the memory unit, equals a version of the information block while determining if the current version of the information block is stored in a storage unit.

20. The method of claim 18 wherein evaluating if a current version of the information block is stored in a storage unit comprises analyzing a monitor data structure representative of exchange of information blocks between the storage unit and the memory unit by non-check-pointing operations.

* * * * *